(12) United States Patent  
Denby et al.

(10) Patent No.: US 8,056,046 B2  
(45) Date of Patent: Nov. 8, 2011

(54) INTEGRATED SYSTEM-OF-SYSTEMS MODELING ENVIRONMENT AND RELATED METHODS

(75) Inventors: Philip M Denby, Everett, WA (US); Don M O'Connell, Renton, WA (US); Ali Bahrami, Sammamish, WA (US); Babak Hamidzadeh, Rockville, MD (US)

(73) Assignee: The Boeing Company, Chicago, IL (US)

( * ) Notice: Subject to any disclaimer, the term of this patent is extended or adjusted under 35 U.S.C. 154(b) by 1578 days.

(21) Appl. No.: 11/124,947

(22) Filed: May 9, 2005

(65) Prior Publication Data

US 2005/0204333 A1 Sep. 15, 2005

Related U.S. Application Data

(63) Continuation-in-part of application No. 10/277,455, filed on Oct. 22, 2002, now Pat. No. 7,506,302.

(51) Int. Cl.  
*G06F 9/44* (2006.01)  
*G06G 7/48* (2006.01)

(52) U.S. Cl. .......................................... 717/104; 703/6

(58) Field of Classification Search ........................ None  
See application file for complete search history.

(56) References Cited

U.S. PATENT DOCUMENTS

| | | | |
|---|---|---|---|
| 5,276,877 A | 1/1994 | Friedrich et al. | |
| 5,594,792 A | 1/1997 | Chouraki et al. | |
| 5,881,268 A * | 3/1999 | McDonald et al. | 703/21 |
| 5,978,576 A | 11/1999 | Sanadidi et al. | |
| 2002/0002448 A1* | 1/2002 | Kampe | 703/22 |
| 2002/0161566 A1 | 10/2002 | Uysal et al. | |
| 2003/0139918 A1 | 7/2003 | Hardwick et al. | |
| 2003/0176931 A1 | 9/2003 | Pednault et al. | |
| 2003/0177018 A1 | 9/2003 | Hughes | |
| 2004/0034857 A1* | 2/2004 | Mangino et al. | 718/104 |
| 2005/0066304 A1* | 3/2005 | Tattrie et al. | 717/101 |

OTHER PUBLICATIONS

Baudin, M.; Mehrotra, V.; Tullis, B.; Yeaman, D.; Hughes, R.A., "From spreadsheets to simulations: a comparison of analysis methods for IC manufacturing performance," Semiconductor Manufacturing Science Symposium, 1992. ISMSS 1992., IEEE/SEMI International, pp. 94-99, Jun. 15-16, 1992.*

* cited by examiner

*Primary Examiner* — James D Rutten  
(74) *Attorney, Agent, or Firm* — Harness, Dickey & Pierce, P.L.C.

(57) ABSTRACT

A method of modeling operational and/or logical aspects of a system in a system-of-systems environment. Modeling components of generic structure are used to obtain a logical model of the system. The logical model and the modeling components of generic structure are used to obtain related models targeted toward the aspects. The related models are implemented to determine effects of the aspects on the system and/or system-of-systems.

20 Claims, 14 Drawing Sheets

INTEGRATED SYSTEM-OF-SYSTEMS MODELING ENVIRONMENT AND RELATED METHODS

CROSS-REFERENCE TO RELATED APPLICATIONS

This application is a continuation-in-part of U.S. patent application Ser. No. 10/277,455 filed on Oct. 22, 2002, the disclosure of which is incorporated herein by reference in its entirety.

FIELD OF THE INVENTION

The present invention relates generally to the modeling of systems and, more particularly, to modeling and analysis of systems in a system-of-systems (SoS) environment.

BACKGROUND OF THE INVENTION

In current modeling environments, a variety of modeling tools are available that provide different ways of analyzing a system. Typically a single characteristic and/or view of a system is modeled to provide insight into a targeted aspect of the system. While such model output may provide results relative to the targeted aspect of the system, no visibility is provided into the impact of behavior associated with the targeted aspect on the behavior of the system as a whole. When modeling efforts are compartmentalized, it can be difficult and time consuming to analyze a large system. Modeling and analysis can be particularly difficult where the system is included in a system-of-systems (SoS).

SUMMARY OF THE INVENTION

The present invention, in one implementation, is directed to a method of modeling one or more operational and/or logical aspects of a system. A plurality of modeling components of generic structure are used to obtain a logical model of the system. The logical model and one or more of the modeling components of generic structure are used to obtain a plurality of related models targeted toward the one or more aspects. The related models are implemented to determine one or more effects of the one or more aspects on the system.

In another implementation, the invention is directed to a method of modeling one or more systems in a system-of-systems (SoS). A plurality of modeling components of generic structure are used to obtain a system architecture for the SoS. The system architecture and one or more of the modeling components of generic structure are used to obtain a plurality of related models targeted toward the one or more systems. A plurality of modeling tools are integrated based on at least one of the following: model description commonality among the tools, and view description commonality among the tools. The related models are implemented using the integrated tools.

In another configuration, the invention is directed to an apparatus for modeling a system. The apparatus includes at least one processor and at least one memory configured to use a plurality of components of generic structure (COGSs) to represent the system as a plurality of architectural components. The apparatus further includes at least one COTS modeling tool. The processor and memory are further configured to provide user runtime input to the COGSs that modifies the system representation, and execute the at least one COTS modeling tool to model the modified system representation using the COGSs and the user input.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of preferred embodiments is merely exemplary in nature and is in no way intended to limit the invention, its application, or uses.

The present invention, in some configurations, is directed to an integrated system-modeling environment for creating, visualizing and executing a plurality of related models for a system and/or system-of-systems (SoS). In one implementation of the present invention, an integrated modeling environment provides a framework for performing analysis of hardware, software and/or operational aspects of a system and/or SoS. Modeling may be performed at a level, determined by a user, that provides data that can be used, e.g., to predict behavior, performance and/or availability profile of a system and/or SoS. Analysis results of the quantitative model outputs can be used to adjust the system and/or SoS, for example, to ensure that system architecture and design meet stated quality metrics.

In some implementations, a modeling framework includes reusable, discrete model components of generic structure (COGS). The modeling framework, which provides a layered approach to modeling, includes COGS and models created using the COGS. For example, method of the invention, in one implementation, includes unifying a plurality of models of processes, data management, information management, architecture, interactions, constraints, performance requirements, and/or physical host(s) of a SoS environment. Model unification can be achieved by abstracting the models to a meta-model level, e.g., by linking model components stored in a repository to obtain a meta-model. Additionally, a plurality of design tools in the environment are integrated on the basis of commonalities among the tools pertaining to model and view descriptions.

Figure 1:
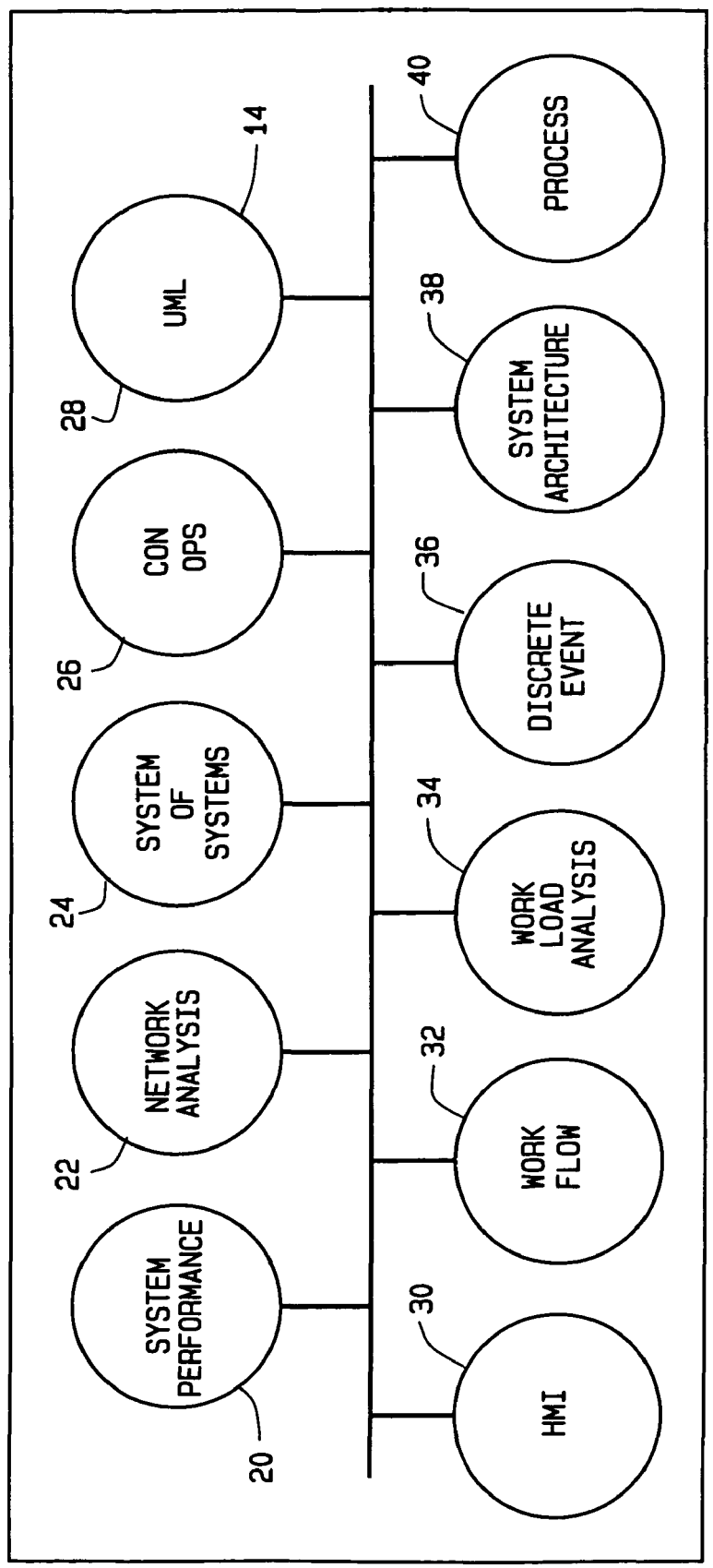
FIG. 1 is a conceptual diagram of a modeling framework according to one implementation of the present invention.

A conceptual diagram of one embodiment of a modeling framework is indicated generally in FIG. 1 by reference number 10. In the framework 10 are provided a plurality of approaches 14 for modeling various aspects of a target system (not shown). Modeling approaches 14 may include, for example, system performance modeling 20, network analysis modeling 22, system-of-systems modeling 24, concept-of-operations modeling 26, object modeling 28 that may be, for example, Unified Modeling Language (UML) based, human-machine interface (HMI) modeling 30, work flow modeling 32, workload analysis modeling 34, discrete event simulation 36, system architecture modeling 38, and process modeling 40. The modeling approaches 14 may be implemented relative to the target system using a plurality of modeling tools, including but not limited to a plurality of commercial off-the-shelf (COTS) products.

Such tools may be integrated semantically with one another on the basis of commonalities in model and view descriptions. Integrating modeling tools may entail mapping between and/or among meta-model and meta-data representations. Using abstracted tool semantics to obtain an integrated model is described in co-pending U.S. patent application Ser. No. 10/277,455 filed on Oct. 22, 2002, the disclosure of which is incorporated herein by reference in its entirety. For example, as described in the foregoing patent application, a workflow information model internal to a COTS workflow tool may be extended (without having to implement code within the tool) to provide a tool-neutral representation of a semantically integrated model of workflow and project management for a process. Using the integrated framework 10, a user may implement a plurality of modeling approaches 14 relative to one or more models integrated in such manner.

Figure 2:
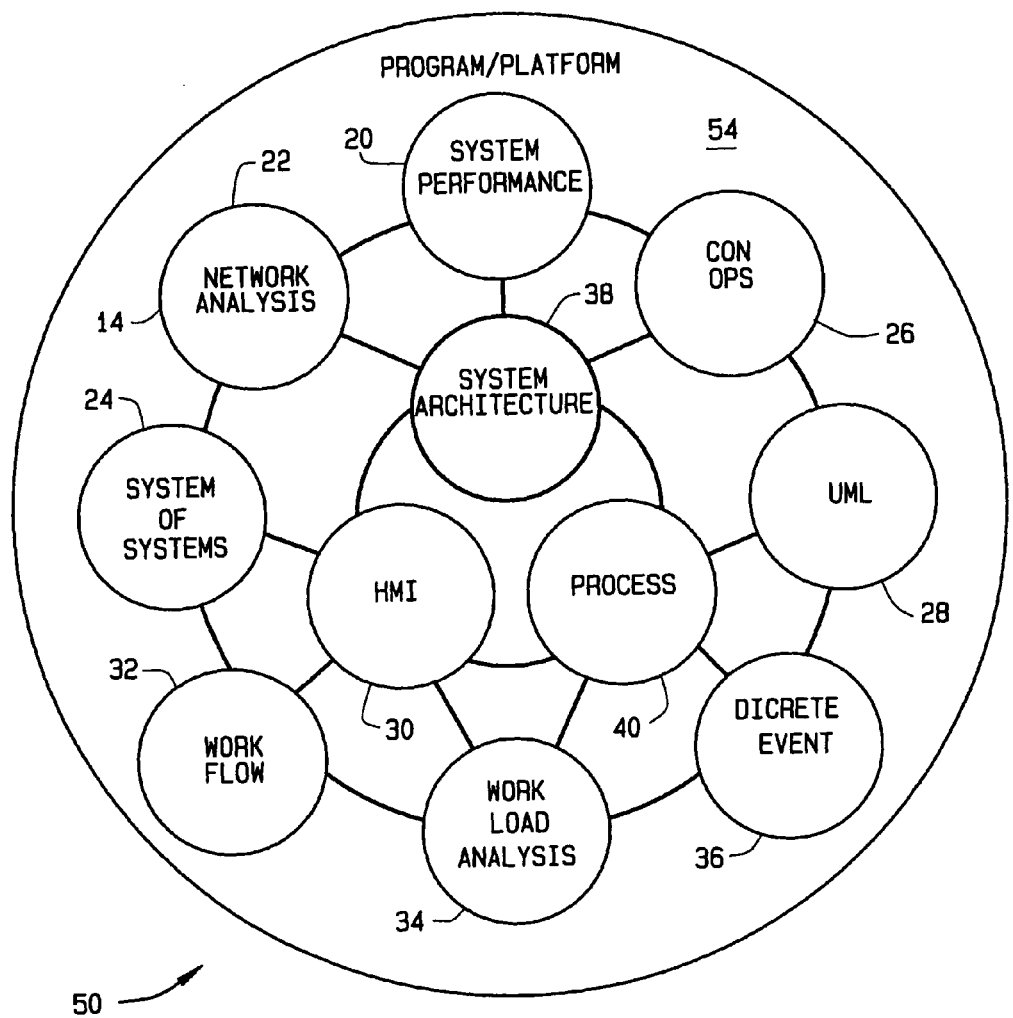
FIG. 2 is a conceptual diagram of a cohesive integrated modeling framework according to one implementation of the present invention.

A conceptual diagram of one embodiment of a cohesive integrated modeling framework is indicated generally in FIG. 2 by reference number 50. The framework 50 is cohesive in that the modeling approaches 14 can be implemented via a single modeling platform or program 54. For example, a single run-time modeling engine can be used to perform a plurality of modeling functions as further described below. In the framework 50 are provided a plurality of modeling approaches 14. A modeling approach 14 may be implemented relative to a target system using one or more modeling tools, including but not limited to one or more commercial off-the-shelf (COTS) products. For example, work flow modeling may be performed using TIBCO InConcert™ by TIBCO Software Inc., of Palo Alto, Calif. Discrete event simulation could be performed using, for example, Extend™ by Imagine That, Inc. of San Jose, Calif.

Figure 3:
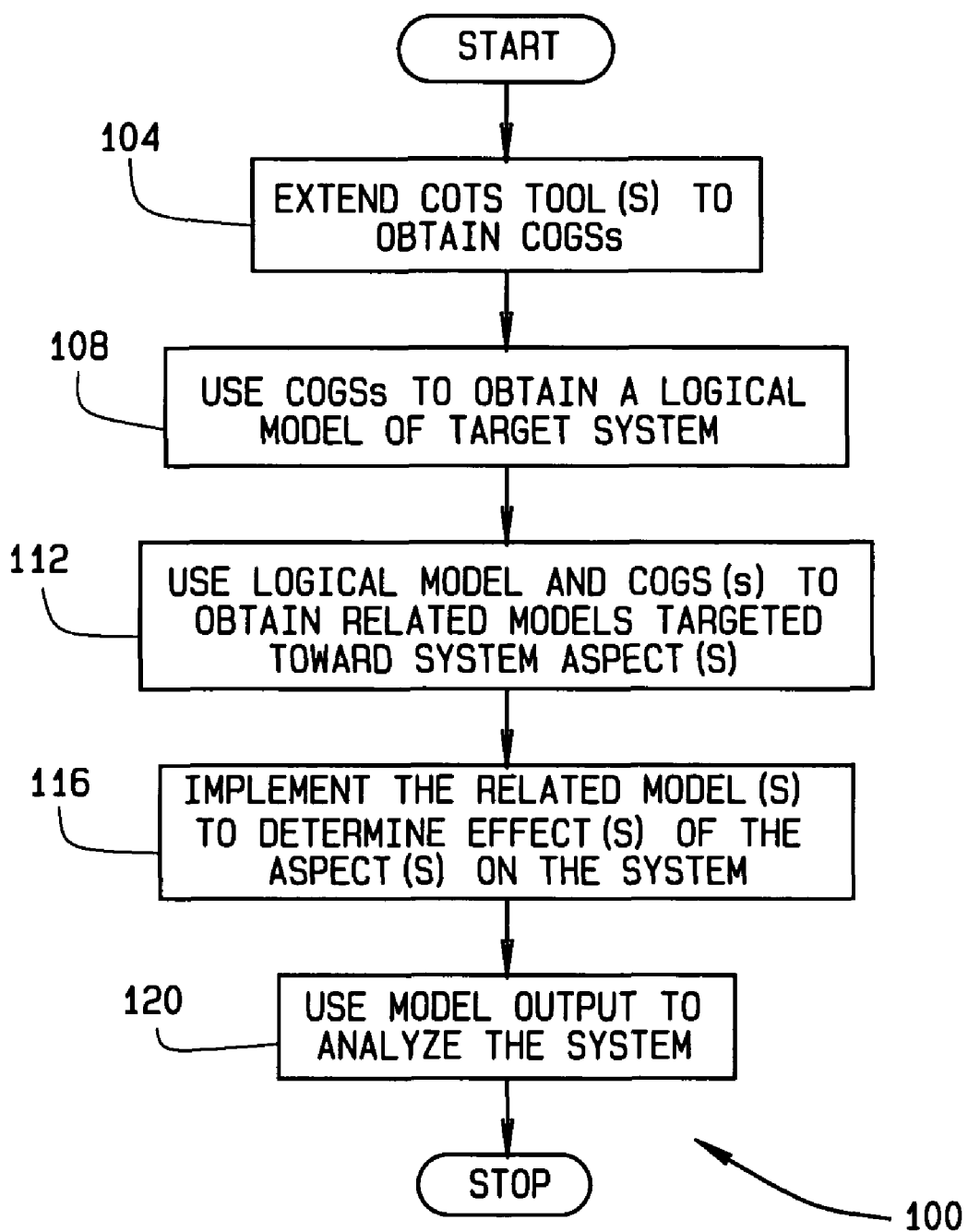
FIG. 3 is a flow diagram of a method of modeling one or more aspects of a target system according to one implementation of the present invention.

In one implementation of the framework 50, the system architecture approach 38 is used to provide a logical model of a target system. The target system may be, for example, a discrete system or a system-of-systems (SoS). A flow diagram describing a method of modeling one or more operational and/or logical aspects of the target system is indicated generally in FIG. 3 by reference number 100. In one implementation, a plurality of modeling components of generic structure (COGSs) are obtained in step 104 by adding extensions to one or more COTS modeling tools. In step 108, the COGSs are used to obtain a logical model, e.g., a system architecture, of the target system. In step 112 the logical model and one or more of the COGs are used to obtain a plurality of related models targeted toward the one or more system aspects. Related models may include but are not limited to one or more operational models, performance models, system component models, and/or discrete event models. In one implementation further described below, related models can include one or more models of hardware and/or software components of the target system. In step 116 the related models are implemented to determine effect(s) of the aspect (s) on the target system. In step 120, output of the implemented models may be used to analyze the target system. Analysis of the model output may be used, for example, to adjust the logical model and/or the target system.

Figure 4:
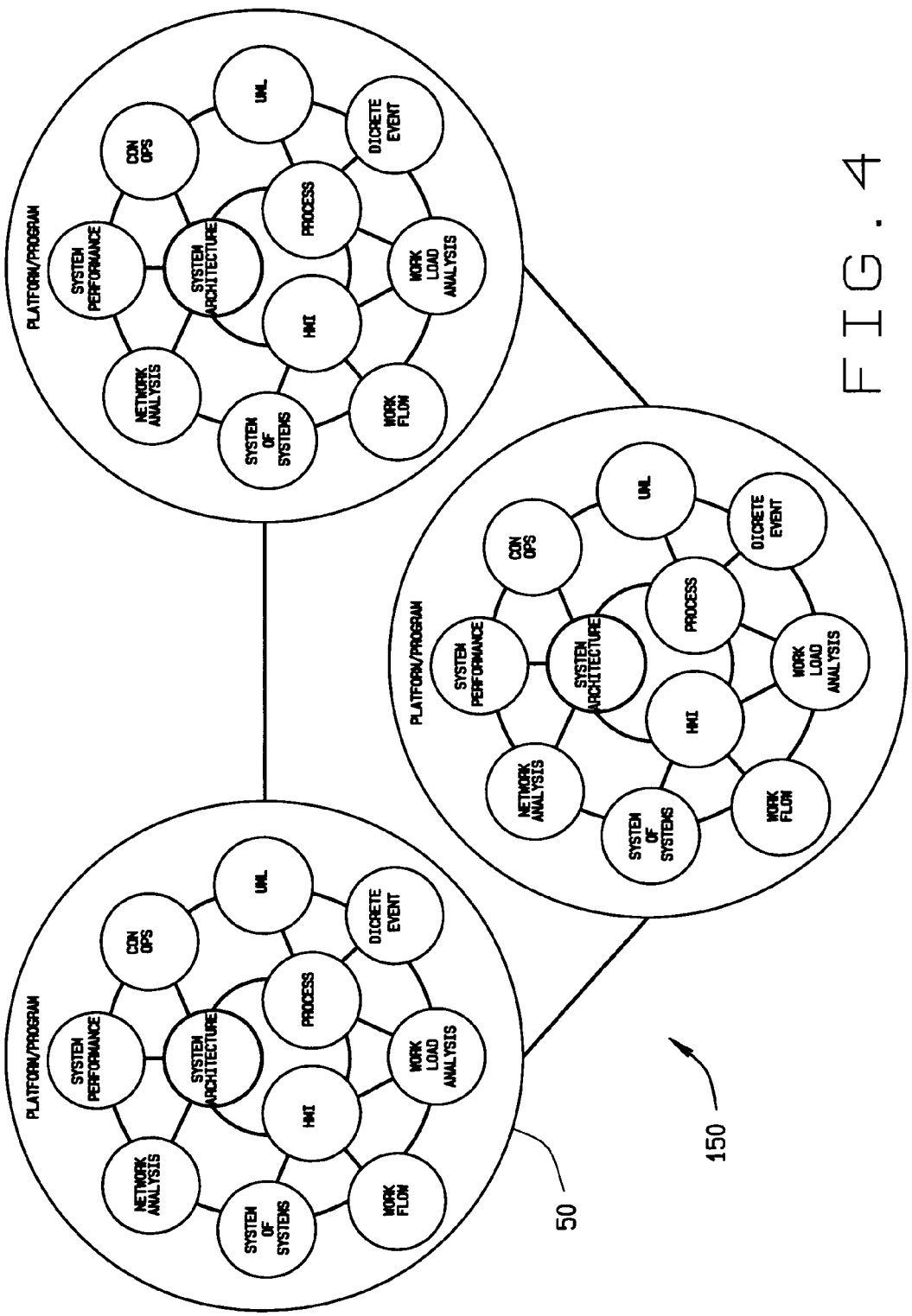
FIG. 4 is a conceptual diagram of an integrated modeling environment for system-of-systems modeling according to one implementation of the present invention.

As previously stated, configurations of the invention may be implemented in connection with a system-of-systems (SoS). A conceptual diagram of one embodiment of an integrated modeling environment for system-of-systems modeling is indicated generally in FIG. 4 by reference number 150. The environment 150 includes a plurality of cohesive integrated modeling frameworks 50, each corresponding to one of a plurality of systems in a SoS. The frameworks 50 are integrated with one another in that modeling is based on a single representation with multiple views of a system architecture and/or system-of-systems environment. A single architecture is the basis for all modeling components and disciplines. The frameworks 50 can be used to model the SoS from operational and/or logical system perspectives. COGSs are used to obtain a system architecture model for the SoS. The SoS system architecture and some or all of the COGs are used to obtain a plurality of related models targeted toward one or more target systems (which may, but does not have to, include the entire SoS). The related models may be implemented to determine effect(s) of the target systems on the SoS. Output(s) of the implemented models may be used to adjust the system architecture model, one or more target systems and/or the SoS.

Figure 5:
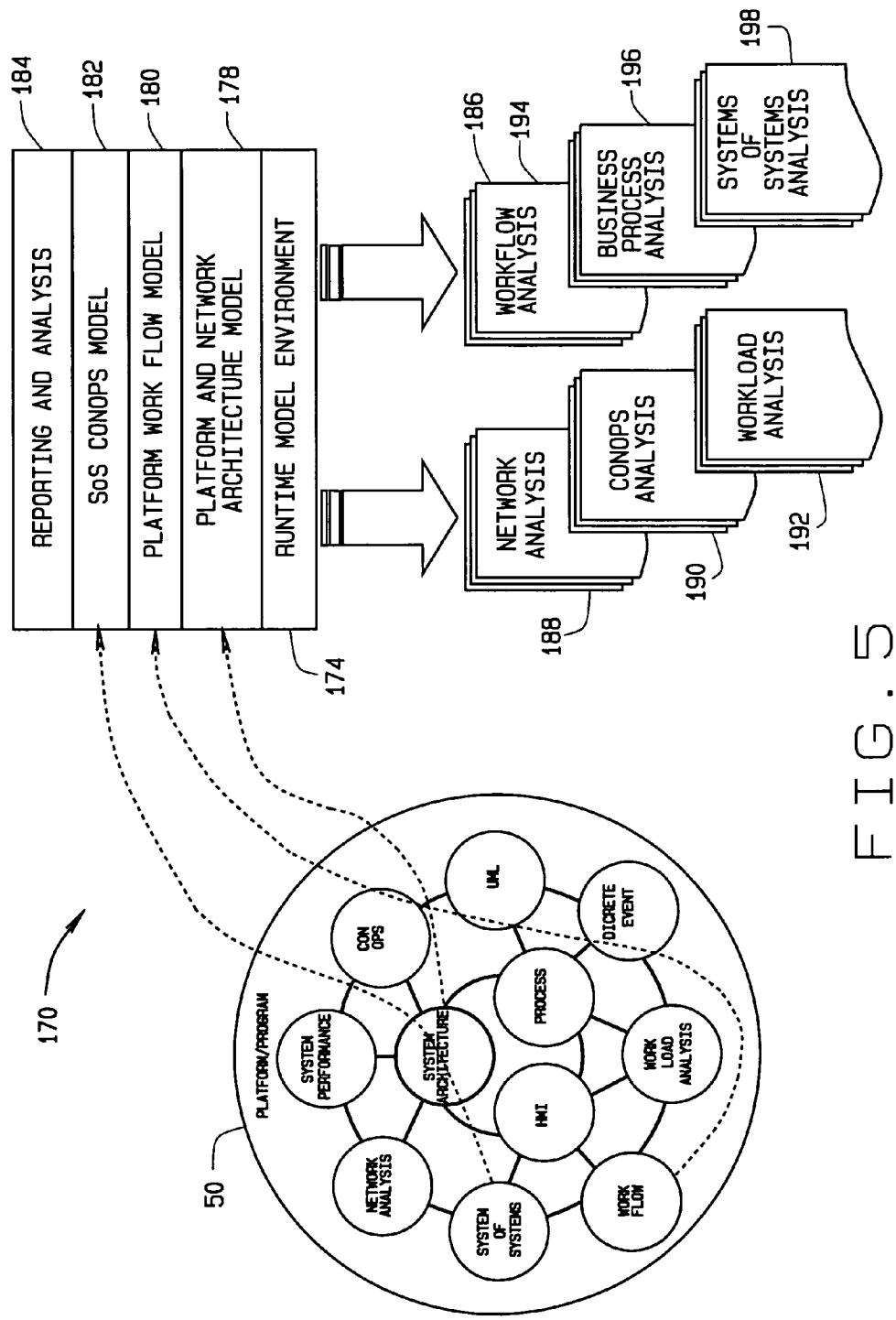
FIG. 5 is a conceptual diagram of a cohesive integrated modeling environment according to one implementation of the present invention.

Models may be developed, modified and executed using a layered runtime model engine which is decoupled from model components and from model intelligence. As further described below, a runtime modeling environment may be controlled dynamically, for example, to execute "what-if" scenarios. A conceptual diagram of an exemplary cohesive integrated modeling environment is indicated generally in FIG. 5 by reference number 170. Runtime models are configured using a cohesive integrated modeling framework 50 and are deployed in a runtime model environment 174. For example, a platform and network architecture model 178 is implemented in the environment 174. A user may deploy a plurality of layered runtime models to produce a plurality of outputs. For example, as shown in FIG. 5, a platform workflow model 180 is deployed on top of the architecture model 178. Additionally, a SoS concept-of-operations model 182 is deployed on top of the models 178 and 180. The foregoing functions are exemplary only; various integrated runtime models could be deployed in which various modeling approaches 14 are used in connection with various integrated models and integrated modeling tools. Reporting and analysis functions 184 pertaining to runtime models may be executed to produce outputs 186. For example, as shown in FIG. 5, outputs 186 generated relative to the runtime models include network analysis 188, con ops analysis 190, workload analysis 192, workflow analysis 194, business process analysis 196, and SoS analysis 198.

Configurations of the integrated modeling environment are scalable in that a user may target a system environment, a layer within a system and/or individual data elements of a system. For example, a user may scale from a software process running on a CPU to a SoS environment. Use cases can be validated on top of a representation of a target system architecture or SoS environment.

Figure 6:
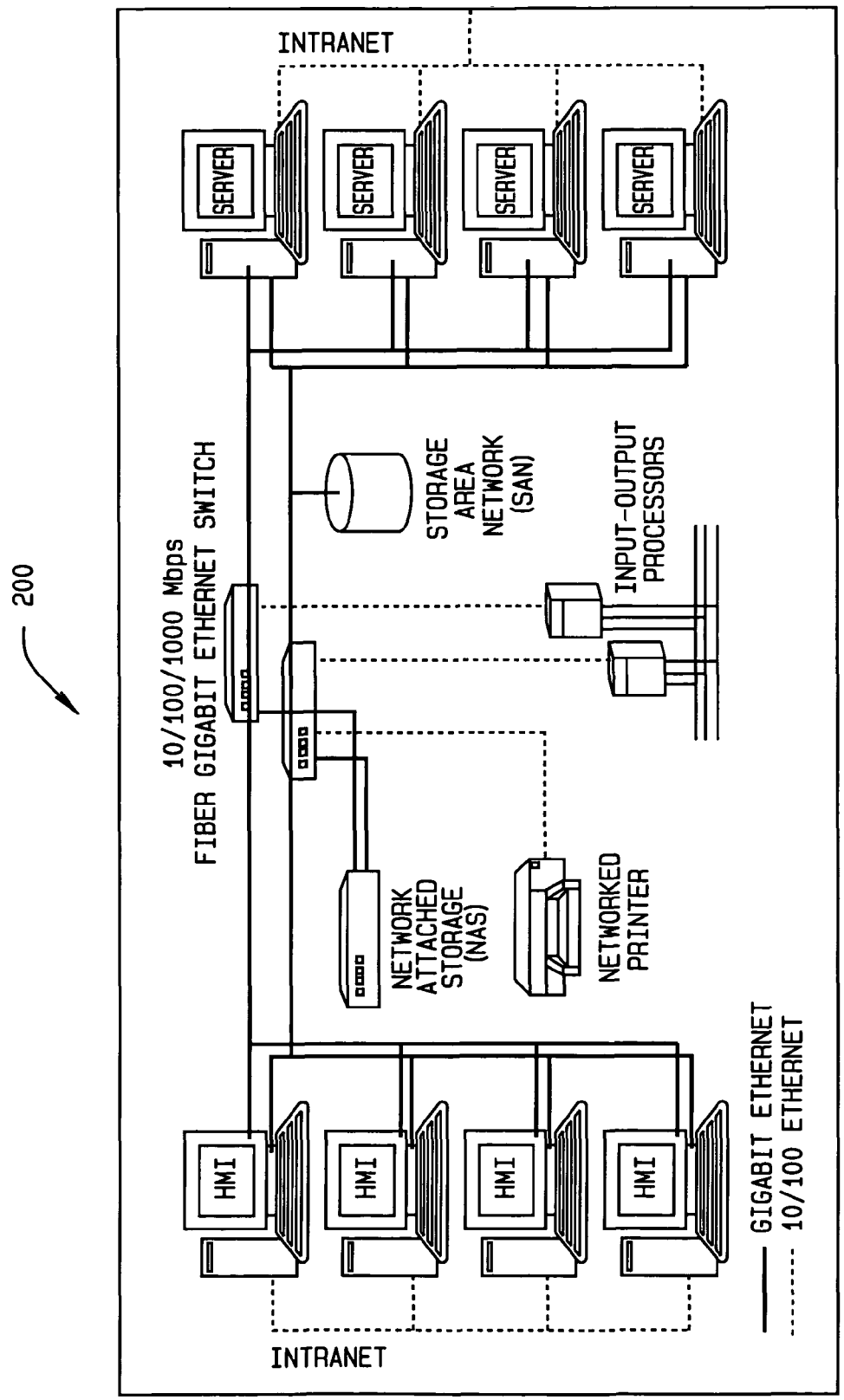
FIG. 6 is a block diagram of a system that can be modeled according to one implementation of the present invention.

Configurations of the integrated modeling environment are extendible in that new models and associated framework components may be added to support dynamic requirements. In one such configuration of the invention, a component-based modeling environment allows for modeling of a systems hardware and software architecture to generate predictive performance analysis data. An exemplary system architecture that can be modeled in accordance with one implementation of the invention is indicated generally in FIG. 6 by reference number 200. In one implementation, the system 200 is modeled using COGSs in combination with a COTS tool to allow modeling of specific attributes of the system.

For example, reusable, configurable COGSs may be combined with a COTS tool such as Extend™ to model architecture performance. COGSs are used to represent generic system elements. Thus a COGS may represent, for example, a resource (e.g., a CPU, LAN, server, HMI, or storage device), a resource scheduler, a subsystem process, a transport component such as a bus or network, or an I/O channel sensor or other I/O device. In the present exemplary configuration, inputs to COGSs are spreadsheet inputs to Extend™ which, for example, can be modified at modeling runtime. COGSs are library components that are programmed to attach to appropriate spreadsheets based on row number. Exemplary spreadsheet inputs are shown in Table 1.

TABLE 1

| Spreadsheet | Use | |
|---|---|---|
| PlatformRouting | Allows routing of most messages to change without changing the model, only this spread sheet. Associates work sheets with process and IOSensor blocks. | Primarily used in processes and I/OSensors. |
| resourceCap | Includes list of resources, with capacities. E.g., includes MIPS strength of a CPU on a node, or kb/sec capacity of a LAN, SAN or NAS. Field list includes resource name, number of resources, capacity units and comments. Process programming is facilitated where an exceedRow is the same as a resource node column. | In hardware models, e.g., server nodes, HMI nodes, disks and transport LAN strength. |
| InputLoads | Includes lists of input sources and input loads to put into the system, e.g., number of radar reports per second. Field list includes input name, records/report, bytes/report. | I/O sensor models. |
| processDepl | Includes the mapping of processes to resources. E.g., a track-ident process can be mapped onto a server node. Field list includes process name, node it is deployed on, process number, ms between cycles and comments. | Process models and transport. |
| processNeeds | Includes an amount of resource that a process/thread needs to complete its task. This can be done on a per record basis, or a per task basis. It can be applied to CPU, LAN or storage resources. E.g., it can state that a track-id process needs 0.01 MIPS per report to perform id. | Process models. |

TABLE 1-continued

| Spreadsheet | Use | |
|---|---|---|
| knobs | Field list includes process/thread name, MIPS needs, on/off and ms between cycles and comments. Knobs are used to modify software behavior and resource usage, e.g., a track capacity that a track manager will broadcast to HMI nodes. Fields include knob name, knob value and comments. Overrides of attributes are done using knobs. | Process models, I/O models. |
| msgTypes | Used to describe additional processing and routing to be done by processes upon receipt of messages. | Process models. |

Figure 7:
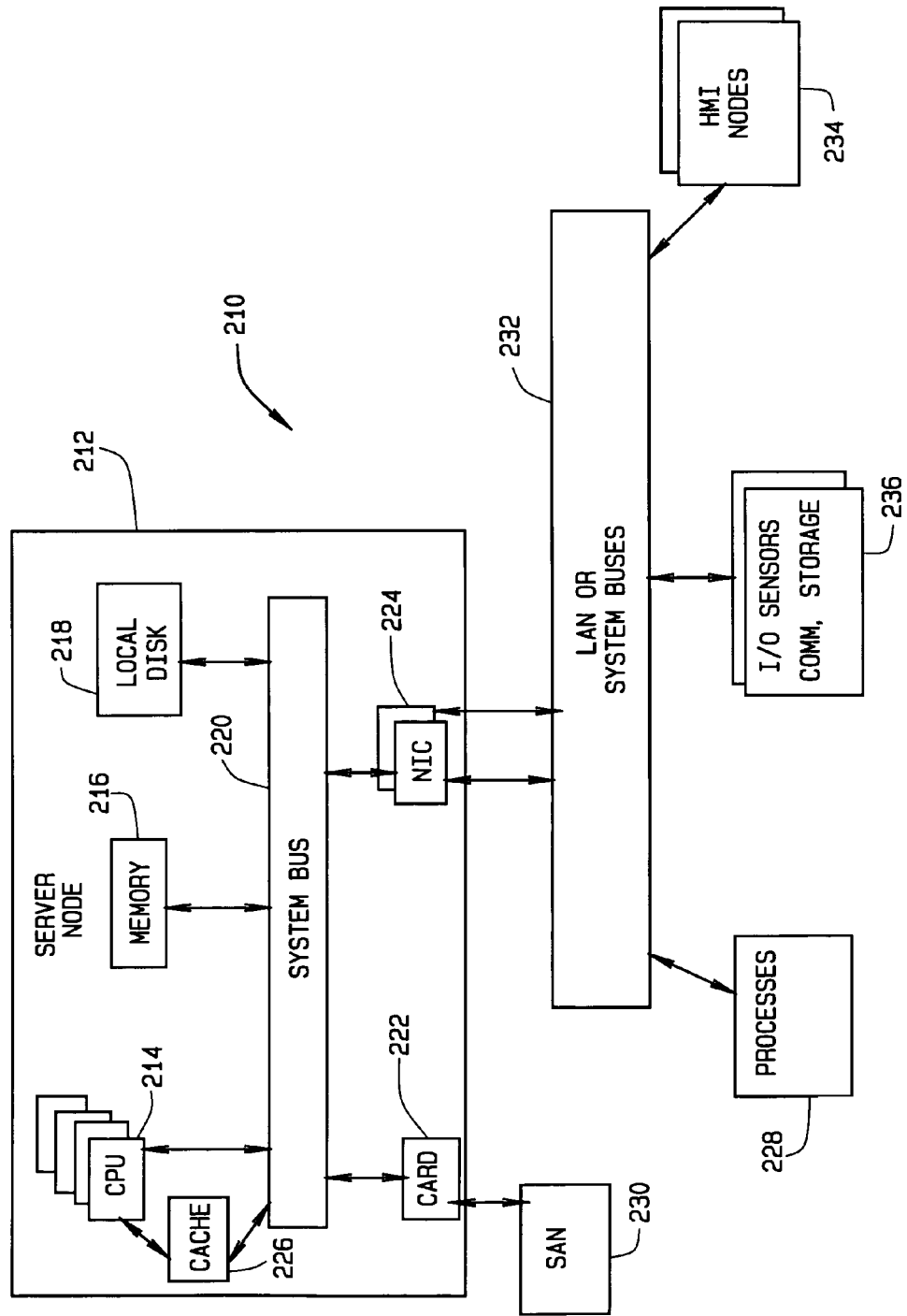
FIG. 7 is a block diagram illustrating how a server node may be modeled as a component of generic structure according to one implementation of the present invention.

A block diagram illustrating how an exemplary server node may be modeled as a COGS is indicated generally in FIG. 7 by reference number 210. In the present example, a server node COGS 212 is modeled as having a plurality of CPUs 214, a memory 216, a local disk 218, a system bus 220, a SAN card 222, a plurality of network interface cards (NICs) 224 and a cache 226. The CPU(s) 214 are used by processes 228 based on messages, rates and MIPS loading. Cache hit rate and cache miss cost may be modeled when a process 228 runs. Cache hit rate and cache miss cost may be input by the spreadsheet resourceCap. Also modeled is usage of the system bus 220 when cache hit or miss occurs. System bus usage, e.g., in terms of bytes transferred, also is modeled when a SAN 230 is accessed. SAN usage is modeled based on total bytes transferred. System bus usage, e.g., in terms of bytes transferred, is modeled when data travels to or from the server node 212 to an external LAN 232 and/or when the local disk 218 is accessed. System bus usage actually implemented relative to the SAN and local disk 218 and for LAN travels is modeled in another COGS, i.e., a COGS for transport as further described below. HMI nodes 234 and I/O sensors, communication and storage 236 also are modeled in COGSs other than the server COGS 212.

Figure 8:
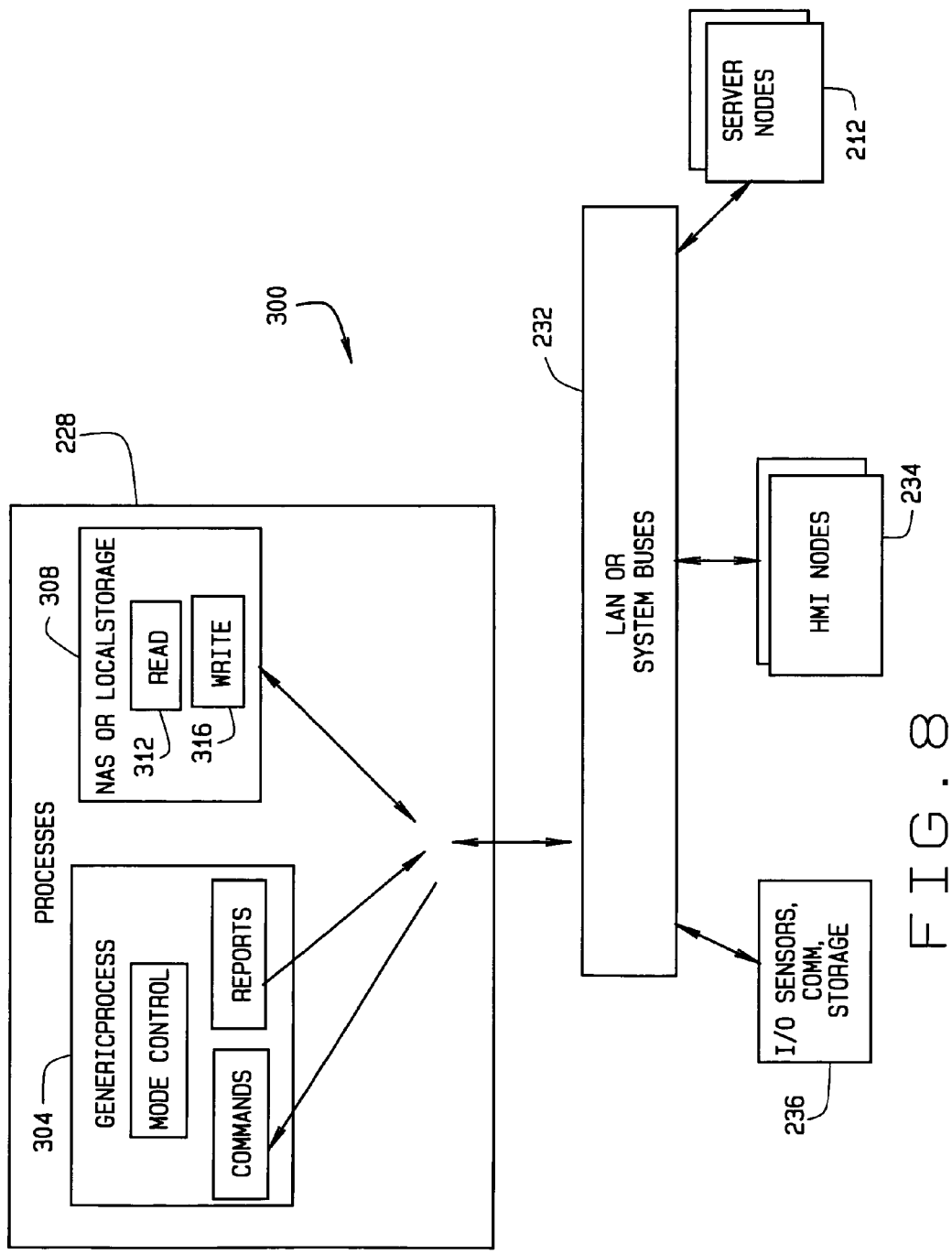
FIG. 8 is a block diagram illustrating how a server process may be modeled as a component of generic structure according to one implementation of the present invention.

A block diagram illustrating how an exemplary server process may be modeled as a COGS is indicated generally in FIG. 8 by reference number 300. In the present example is modeled a generic process 304 used to sink messages, react to messages, and create messages. The process 304 is modeled to use an appropriate amount of computing resources. A message includes attributes necessary to send the message through a LAN 232 to a destination. Generic processes may be programmed primarily using the processDepl and processNeeds spreadsheets. Generic process models may also include models for translators, generators, routers and sinks. NAS or localStorage 308 may be modeled as a node, with Kbyte bandwidth defined using the spreadsheet resourceCap. Processes "read" 312 and "write" 316 are modeled to utilize bandwidth on a designated node. Generally, generic process models may be replicated and modified as appropriate to build a system model.

Figure 9:
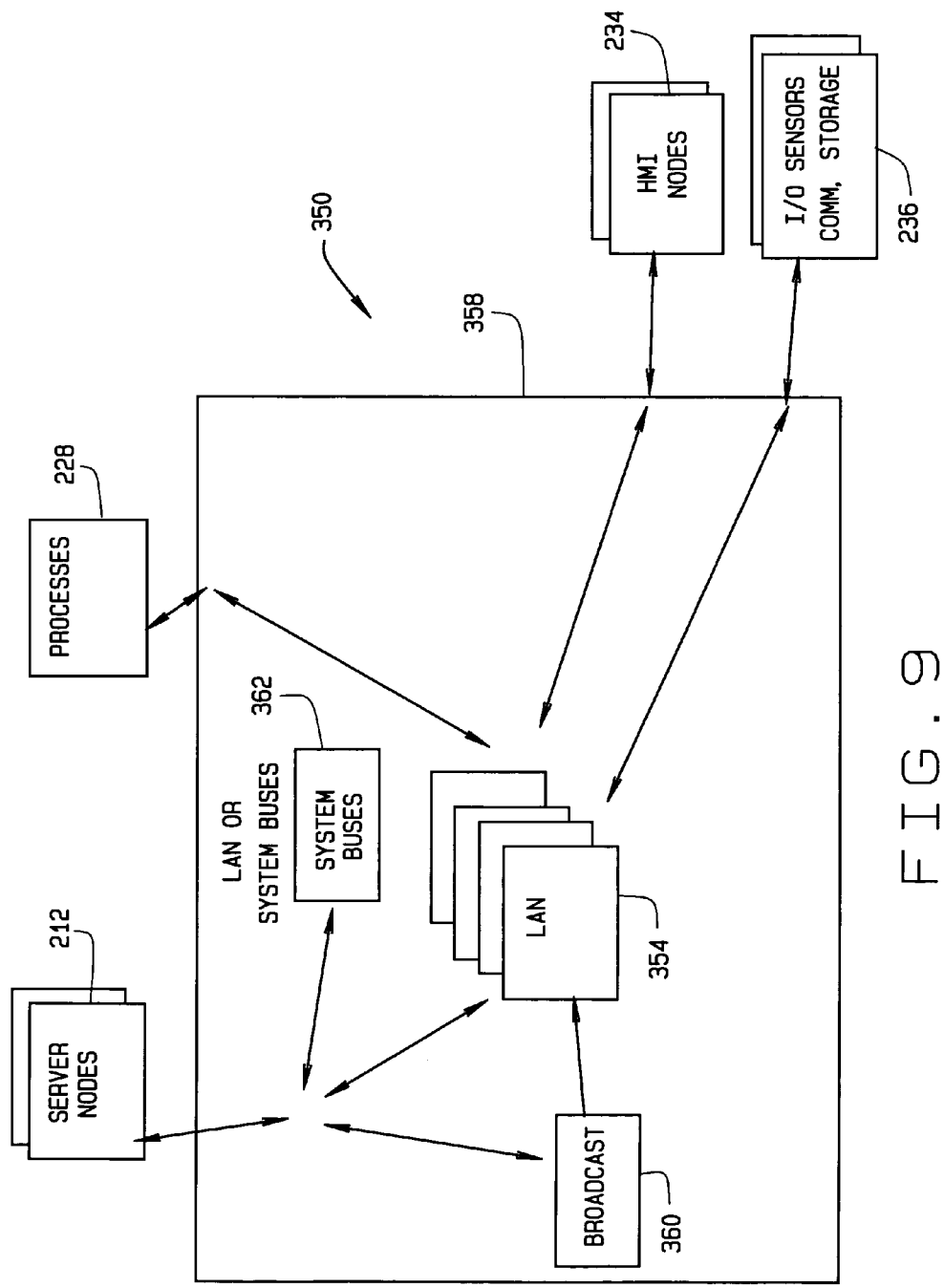
FIG. 9 is a block diagram illustrating how one or more local area networks (LANs) and/or system buses may be modeled as a component of generic structure according to one implementation of the present invention.

A block diagram illustrating how one or more LANs and/or system buses may be modeled as a transport COGS is indicated generally in FIG. 9 by reference number 350. In the present example, a plurality of LANs 354 are modeled, each having a different Kbytes-per-second bandwidth capacity. A model 358 represents any shared bus and/or any dedicated bus. A model 360 represents broadcast. The model 360 uses broadcast groups, then replicates messages for a single LAN 354 and forwards the messages to the proper LAN 354. The transport COGS 358 implements usage of system buses 362 for server nodes 212 and/or HMI nodes 234. Bus usage is implemented based on destination and source node attributes. The transport COGS also implements LAN 354 usage behavior, such as load balancing across LANs and/or use by a single LAN. After LAN and system bus resources are modeled as having been used, the transport COGS 358 routes messages to appropriate places, e.g., to processes 228, HMI nodes 234 or I/O sensors 236.

In one implementation of the invention, to build a model describing the system 200, static models first are created and analyzed. Such models may include models for key system components, deployment architectural views, process and data flow views, key performance parameters, assumptions, constraints, and system architect inputs. The architectural view, static models, system architect predictions and modeling tools are used to create initial dynamic models. Additional inputs, e.g., from prototypes, tests, vendors, and additional architectural decisions may be used to refine the dynamic models and obtain further inputs to the system architecture. Documentation may be produced that includes a performance profile, assumptions used in creating the models, static model and associated performance analysis, dynamic model and associated performance analysis, risks associated with the system architecture, suggested architectural changes based on the analysis, and suggestions as to how to instrument the system 200 to provide "real" inputs to the model.

Figure 10:
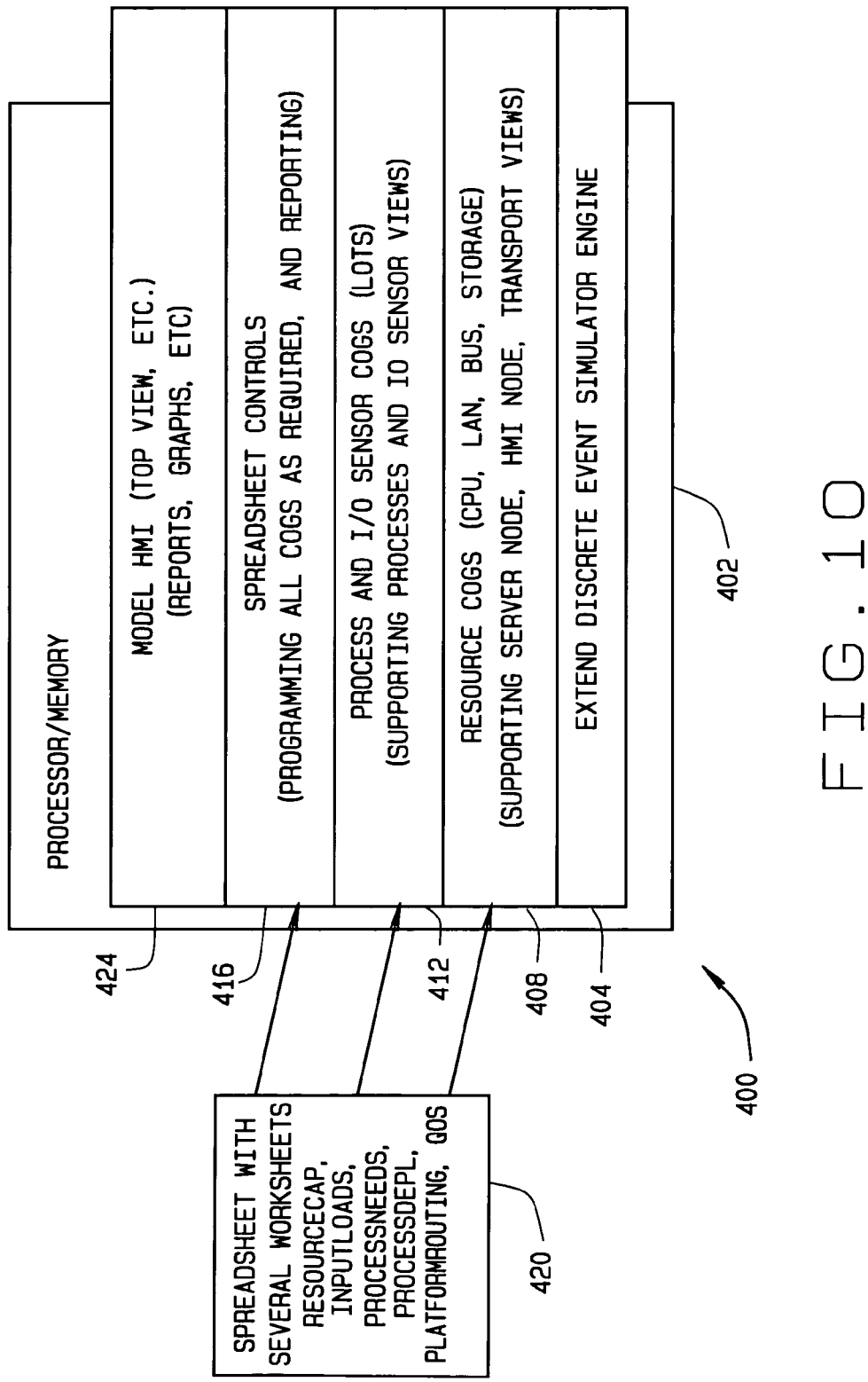
FIG. 10 is a conceptual diagram of dynamic modeling construction according to one implementation of the present invention.
Figure 11:
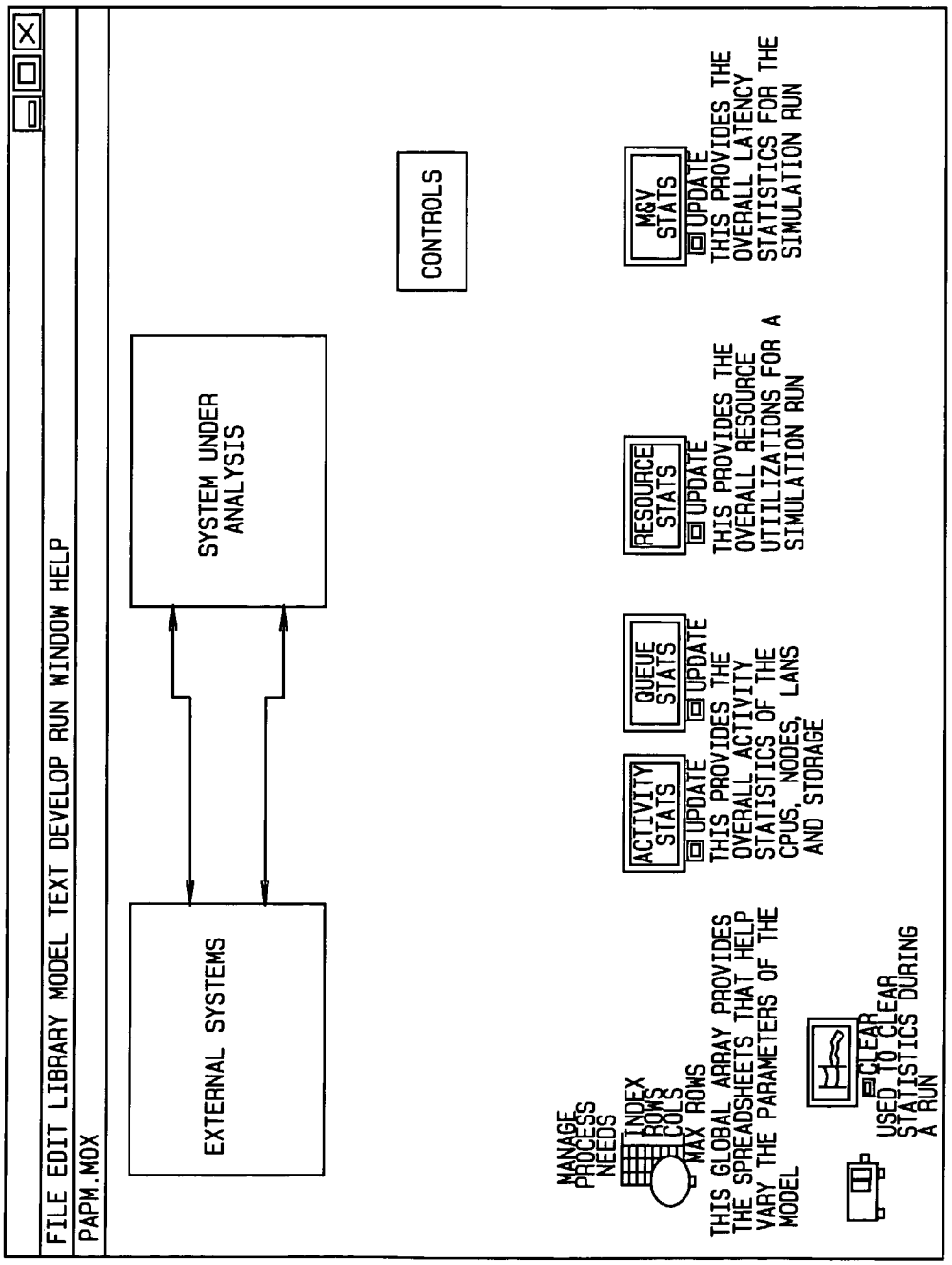
FIGS. 11-13 are exemplary screenshots according to one implementation of the present invention.
Figure 12:
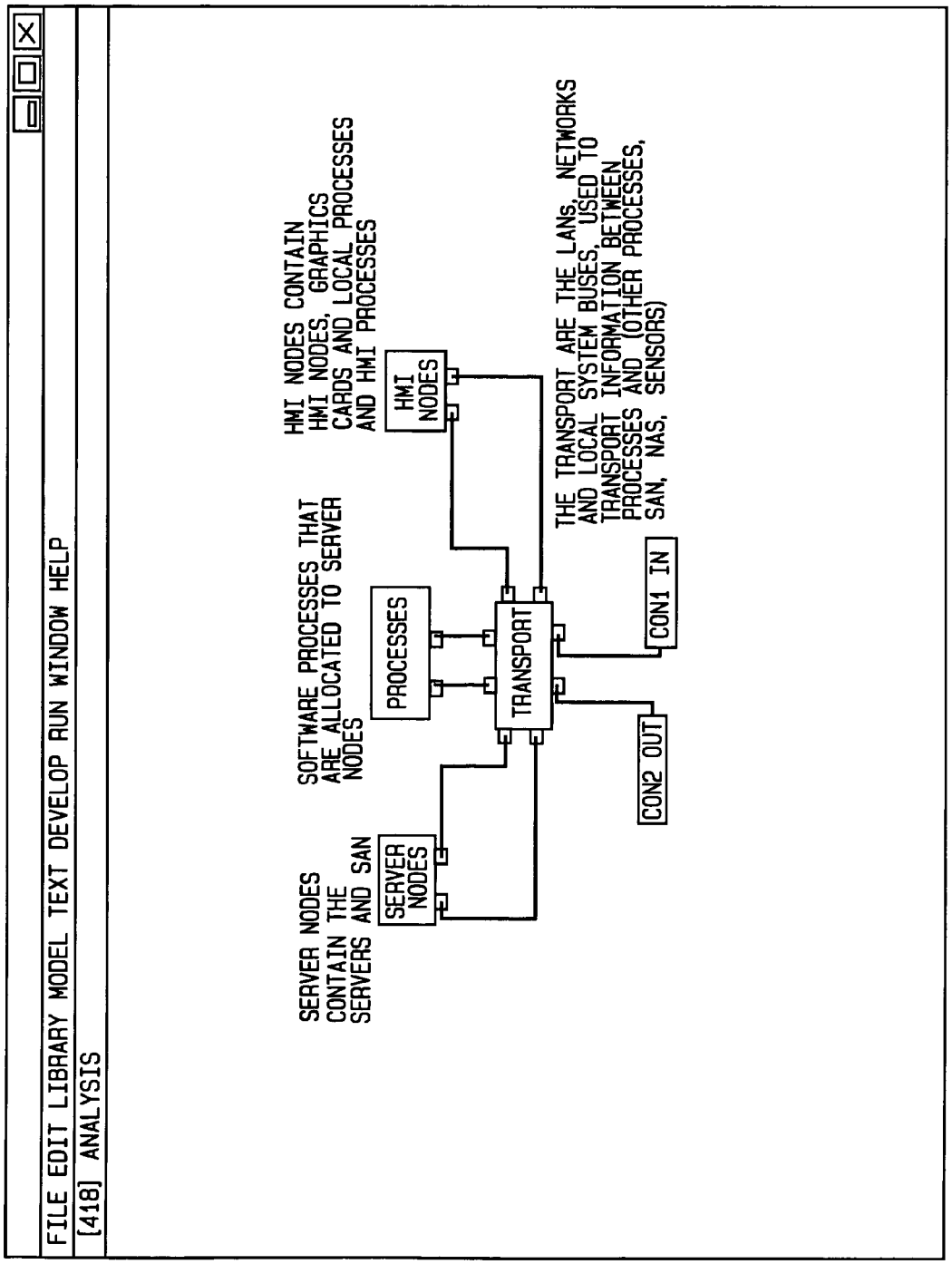
Figure 13:
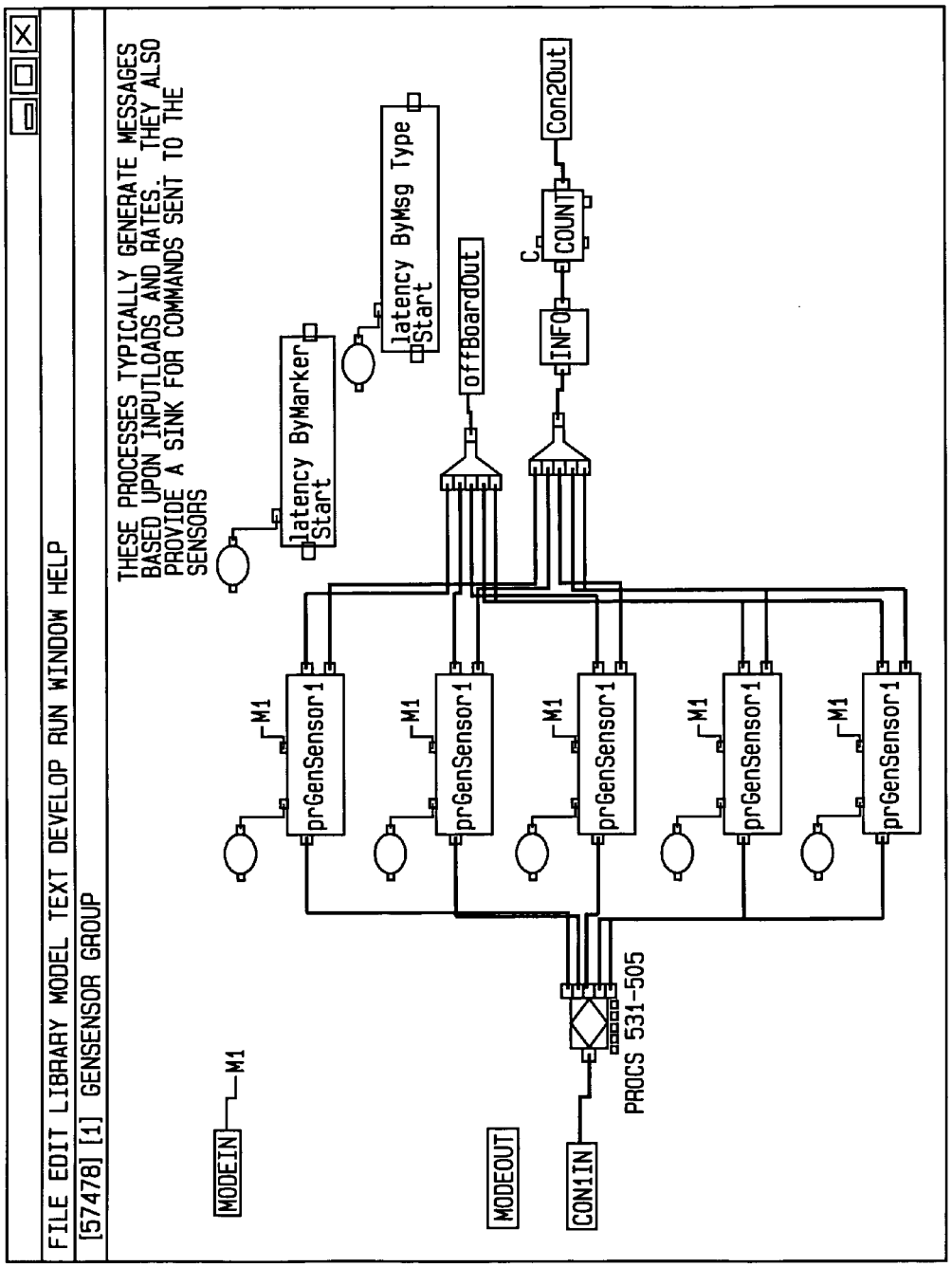
Figure 14B:
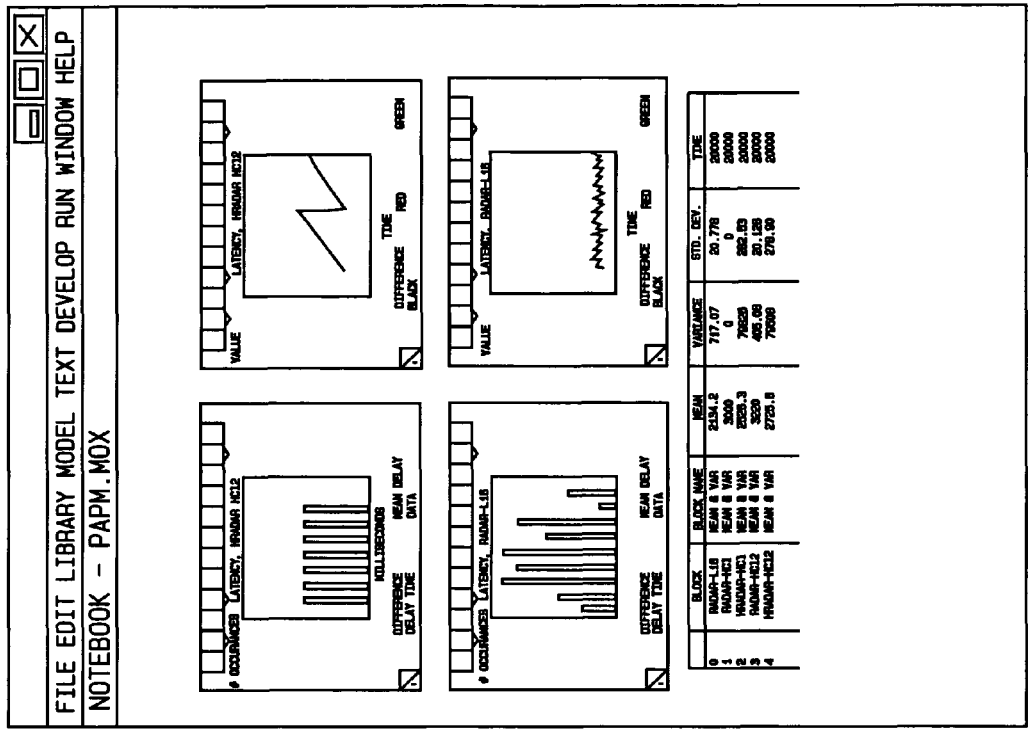
FIGS. 14A and 14B are exemplary outputs of modeling according to one implementation of the present invention.
Figure 14A:
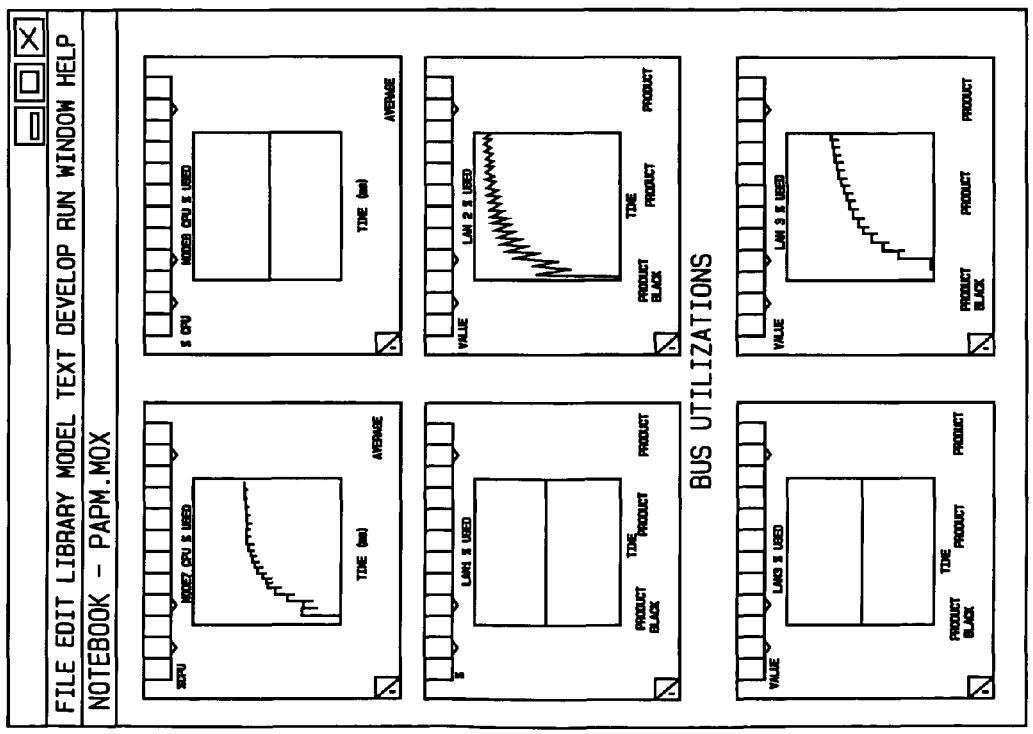

A conceptual diagram of one implementation of dynamic modeling is indicated generally in FIG. 10 by reference number 400. The modeling is performed in a computing environment 402 including a processor and memory. An Extend™ discrete event simulator engine 404 is used to perform discrete event simulation of hardware and software under analysis. Reusable resource COGSs 408 and process and I/O sensor COGSs 412 are used to model nodes, networks, buses, processes, communications and sensors. Spreadsheet controls 416 are applied via one or more spreadsheets 420 to the COGSs 408 and 412. A HMI 424 is used to run the model and show reports. Exemplary HMI screenshots are shown in FIGS. 11, 12 and 13. Exemplary outputs of modeling are shown in FIGS. 14A and 14B. Exemplary deployment changes and how they are performed are shown in Table 2.

TABLE 2

| DEPLOYMENT CHANGE | HOW IT IS DONE |
| --- | --- |
| Change the deployment of a server process from one server node to another. | Change processDepl node cell value in process row. |
| Change the deployment of an HMI process from one node to another. | Change hmiDepl process row from one row to another. Change appropriate node and process id cells. In process model, change appropriate row identifiers to new process row. |
| Change all server processes to 3 node configuration. | Change all processDepl cells to desired 3 server nodes. |
| Change storage from NAS to SAN. | Change all associated messageDest field from NAS to SAN destination, in inputs to process block. |
| Change LAN strength | Change resourceCap spreadsheet on appropriate LAN row. |
| Load balance across multiple networks. | Add appropriate processDepl lines for traffic destination. Change transport view to use these LANS. |
| Change strength of LAN | Change resourceCap spreadsheet, appropriate row and cell to new strength. |

The foregoing modeling framework thus allows component configurations to be easily modified at runtime, enabling the ability to perform rapid "what-if" scenarios. Such configurations include but are not limited to number of CPUs, strength of CPUs, LAN configuration, LAN utilization, system and I/O buses, graphics configuration, disk bandwidth, I/O configuration, process deployment, thread deployment, message number, size and frequency, and hardware and software component availability. System and/or SoS availability can be modeled to predict, for example, server availability and impact on performance, network availability and impact on performance, fault tolerance and how it impacts system function, redundancy and where redundancy is most effective, load balancing, and how loss of load balance impacts system performance. Modeling can be performed that incorporates system latency, and that represents message routing based on a destination process (as opposed to being based on a fixed destination). Impact of a system event on other systems and/or a wide-area network can be analyzed within a single system model environment.

The foregoing framework supports a realistic representation of a system model, including but not limited to a load-balanced LAN, broadcast messages on a LAN, local storage with system bus implications, SAN with system bus implications, I/O control with switches, fine-grain messages, and fine-grain processes and threading. Historical data from deployed systems and definitions and results of previous system models can be captured and used to improve future decision making and/or validate design decisions.

The foregoing framework allows for dynamic control of runtime model environments. In some implementations, knobs may be used to control system model behavior. An unplanned event may be injected into a current model and its impact on the current model can be analyzed. Views of a system model can be added and/or removed. A model can "evolve" as a system being modeled matures. Issues can be identified early in the design process and/or phases, and design and technology decisions can be validated prior to investing time and resources. Thus lifecycle decision making can be improved, and schedule, cost and technical risk can be reduced through analysis of the quantitative data generated by the model runs and actions taken as a result of the analysis.

Model components at various levels of the above-described framework allow for a system to be modeled and analyzed from vertical and/or horizontal perspectives, thereby providing an ability for a user to "drill down" and focus on an area of concern while maintaining an ability to understand impact(s) of lower level change(s) on an overarching model environment. A modeling environment can be provided that supports both an individual system model and system-of-systems modeling. Such an environment facilitates analysis and design and provides system-of-systems visualization, validation and testing capabilities, since some of the correctness of a system can be built into the modeling tools themselves.

Using COGS enables the rapid creation and modification of models as well as the rapid execution of "what-if" scenarios based on the models. The ability to overlay multiple model views, whether operational or logical, on top of a logical model of the system architecture provides the capability to determine the impact of scenarios associated with these models on the current representation of the system and/or the system-of-systems architecture. This capability allows for a complete representation of the end-to-end horizontal and top-to-bottom vertical view of the modeled environment. The ability provided by embodiments of the present invention to determine impacts on disparate systems from both an operational and a logical system perspective can provide significant insight early in a design process and thus can reduce time, cost and risk associated with system design projects. The ability to quickly and easily update models throughout the life of a development program to reflect a current view of a system and/or system of systems as a means of minimizing risk provides continual insight into the system behavior as design and/or technology decisions are being considered.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of determining one or more operational and/or logical aspects of a system, the method performed using one or more processors and memory, the method comprising:
    extending a plurality of commercial off-the-shelf (COTS) tools that provide different modeling approaches for modeling the one or more operational and/or logical aspects, the extending performed using commonalities among the tools in model and view descriptions to obtain a plurality of modeling components of generic structure, the extending performed at least in part by providing mappings among meta-model and/or meta-data representations by the tools thereby providing model unification;
    using the modeling components of generic structure to obtain a system architecture model of a physical system;
    based on the system architecture model, using one or more of the modeling components of generic structure to obtain a plurality of related models targeted toward the one or more aspects;
    deploying the related models relative to the system architecture model, the deploying comprising implementing two or more of the different modeling approaches; and
    based on one or more results of the deploying, developing and/or adjusting the physical system.

2. The method of claim 1, wherein the related models include one or more of the following: a concept of operations model, a business process model, a workflow model a workload model, and a discrete event model.

3. The method of claim 1, the deploying further comprising providing runtime input to specify particular configurations of one or more architectural components;
    the method further comprising, based on the one or more results of the deploying, changing the input to vary the particular configurations of one or more of the architectural components for a subsequent deploying step.

4. The method of claim 3, wherein the related models include at least one of the following: a model for predicting performance and a model for predicting scalability.

5. The method of claim 1, wherein the related models include a data management model.

6. The method of claim 1, wherein the COTS tools include a discrete event simulation tool, and the components of generic structure include components describing architectural components of the system.

7. The method of claim 1, further comprising, based on the one or more results of the deploying, adjusting at least one of the following: the system architecture model, and a system-of-systems (SoS) including the physical system.

8. The method of claim 1, wherein the components of generic structure are used to obtain at least one of the following: a model of a hardware component of the system and a model of a software component of the system.

9. The method of claim 1, wherein the different modeling approaches include at least two of the following: system performance modeling, network analysis modeling, system-of-systems modeling, concept-of-operations modeling, object modeling, human-machine interface modeling, work flow modeling, workload analysis modeling, discrete event simulation, system architecture modeling, and process modeling.

10. A method of developing one or more systems in a physical system-of-systems (SOS), the method performed using one or more processors and memory, the method comprising:
    semantically integrating a plurality of commercial off-the-shelf (COTS) tools that provide different modeling disciplines for modeling aspects of a system, the integrating performed using commonalities among the tools in model and view descriptions to obtain a plurality of modeling components of generic structure, the integrating performed at least in part by providing mappings among meta-model and/or meta-data representations by the tools thereby providing model unification;
    using the modeling components of generic structure to obtain a system architecture model for the SoS;
    using the system architecture model and one or more of the modeling components of generic structure to obtain a plurality of related models for implementing one or more of the different modeling disciplines targeted toward the one or more systems;
    implementing the related models relative to the system architecture model using the integrated tools; and
    based on the implementing, developing the one or more systems.

11. The method of claim 10, wherein implementing the related models comprises using a runtime model engine operable irrespective of to provide a plurality of model views overlaid in relation to the system architecture model.

12. The method of claim 10, wherein the one or more systems include a plurality of subsystems, the method further comprising configuring the modeling components of generic structure to model one or more aspects across two or more of the subsystems.

13. The method of claim 10, wherein the one or more systems include a plurality of subsystems, the method further comprising using a plurality of the modeling components of generic structure to model at least one of an impact of a subsystem on the one or more systems, an impact of the one or more systems on a subsystem, an impact of the one or more systems on the SoS, and an impact of the SoS on the one or more systems.

14. An apparatus for modeling a system, the apparatus comprising:
    at least one processor and memory configured to:
        use a plurality of modeling components of generic structure (COGSs) obtained from mappings among meta-model and/or meta-data representations thereby providing model unification by a plurality of commercial off-the-shelf (COTS) modeling tools for a plurality of different modeling disciplines, the COGSs obtained based at least in part on model and view description commonalities among the COTS tools;
        use the COGSs to represent the system as a plurality of architectural components;
        provide user runtime input to a plurality of related models that use the COGSs for providing a plurality of different views of the architectural components; and
        execute one or more of the COTS modeling tools to deploy the related models.

15. The apparatus of claim 14, wherein the architectural components comprise a model of at least one of the following: a system-of-systems (SoS) architecture, a software architecture, a network architecture, a computer architecture and a system of systems architecture.

16. The apparatus of claim 14, wherein the COTS tools comprise a discrete event modeling tool.

17. The apparatus of claim 14, wherein a COGS represents one or more of the following: a server node, a HMI node, an I/O channel device, a transport, a process, and a resource.

18. The apparatus of claim 14, wherein the user runtime input comprises one or more spreadsheets.

19. The method of claim 1, wherein the modeling components of generic structure include models for memory, cache, storage, and buses.

20. The apparatus of claim 17, wherein a process COGS is selectable to represent at least one of the following: a client, a server, a database, an algorithm, messaging, an infrastructure, multithreading, a user interface, time based processing, and delayed processing.

* * * * *